T. J. McBURNEY & J. McALISTER.
SCREEN FOR WINDOWS OR DOORS.
APPLICATION FILED JUNE 16, 1911.
1,016,842.
Patented Feb. 6, 1912.
2 SHEETS—SHEET 1.
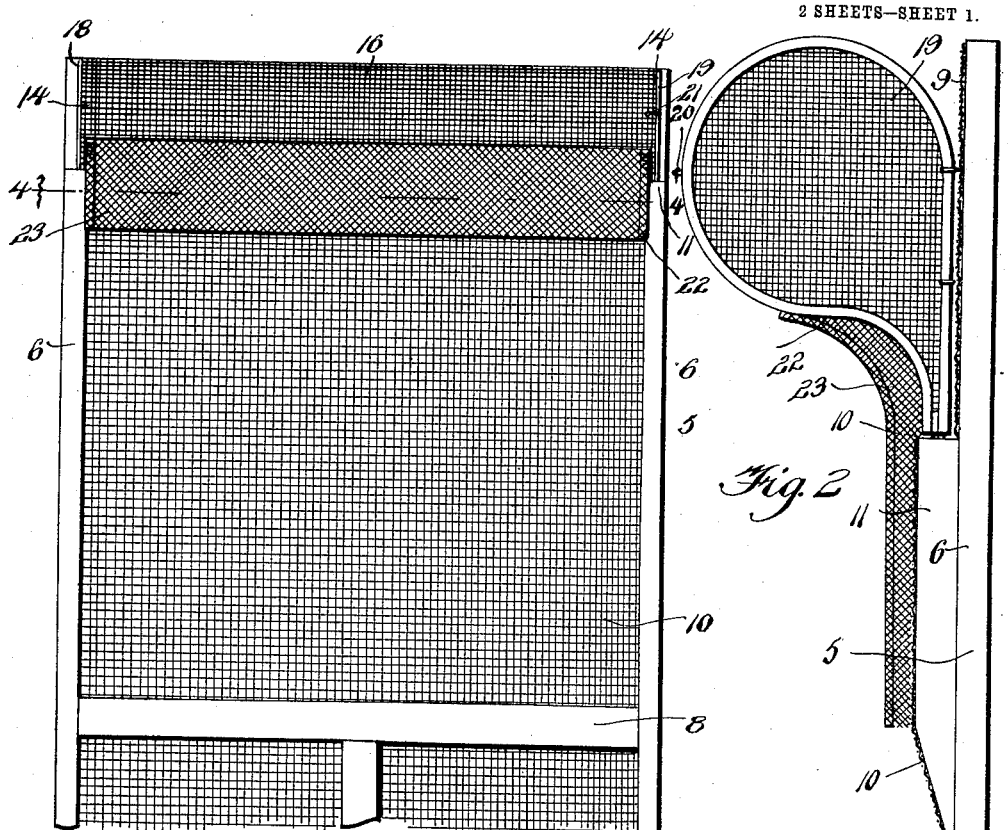
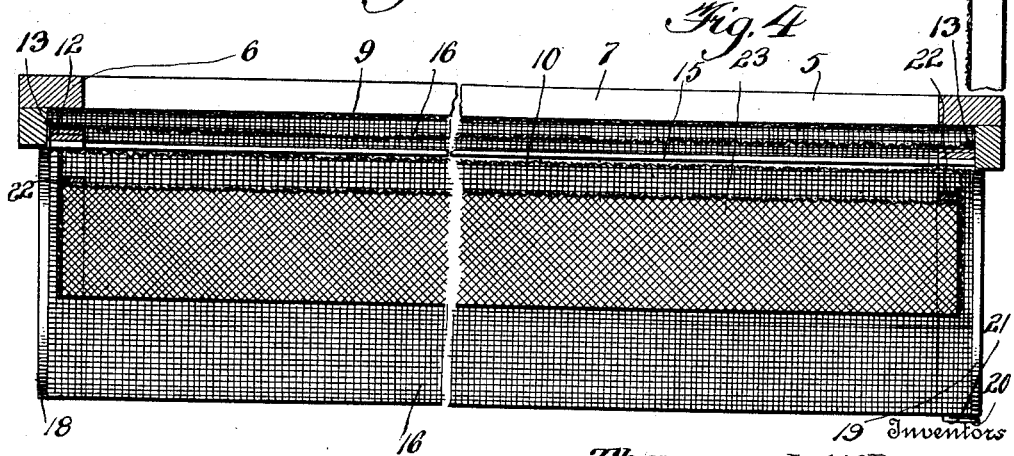
Witnesses
W. S. McDowell
L. O. Parker
Inventors
Thomas J. McBurney
John McAlister
By Victor J. Evans
Attorney

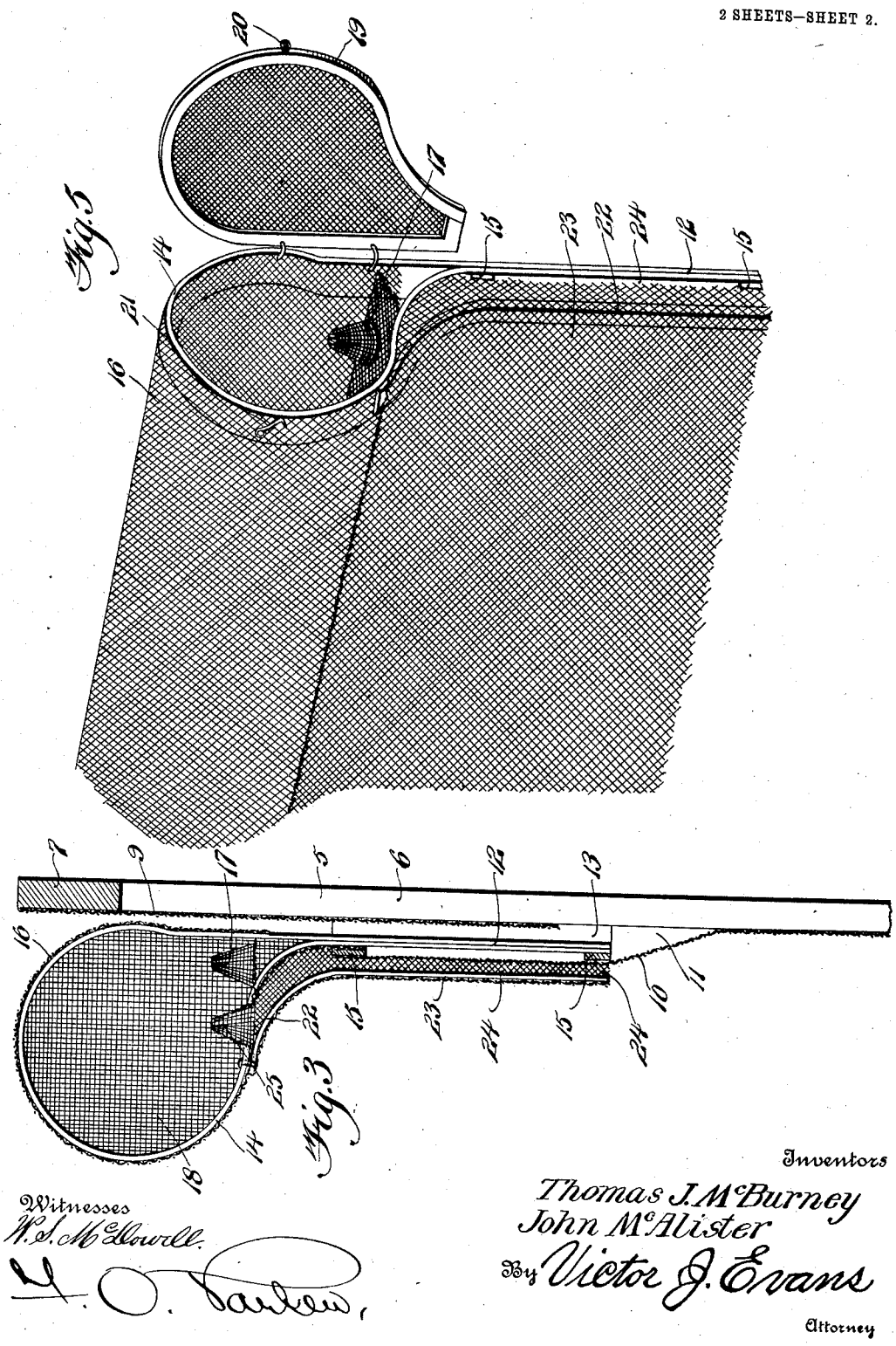

UNITED STATES PATENT OFFICE.

THOMAS J. McBURNEY, OF FORT BAYARD, AND JOHN McALISTER, OF CENTRAL, NEW MEXICO.

SCREEN FOR WINDOWS OR DOORS.

1,016,842.   Specification of Letters Patent.   Patented Feb. 6, 1912.

Application filed June 16, 1911. Serial No. 633,568.

*To all whom it may concern:*

Be it known that we, THOMAS J. MC-BURNEY and JOHN MCALISTER, citizens of the United States, residing at Fort Bayard and Central, respectively, in the county of Grant and State of New Mexico, have invented new and useful Improvements in Screens for Windows or Doors, of which the following is a specification.
The invention relates to door or window screens, and more particularly to the class of screen having removable traps.

The primary object of the invention is the provision of a screen in which insects or flies will be excluded from the interior of a room or the like, and will be trapped when falling upon either the inside or outside face of the said screen, so that the same may be readily and easily exterminated.
Another object of the invention is the provision of a screen in which a trap is removably mounted thereon, so that flies or other insects will be caught therein, without possibility of the insects gaining an entrance to a room or the like from the outside thereof, the trap, when removed from the screen, permitting the destroying of the said insects.

A further object of the invention is the provision of a screen of this character which is simple in construction, reliable and efficient in operation, strong, durable, and inexpensive in operation.

With these and other objects in view, the invention consists in the construction, combination and arrangement of parts, as will be hereinafter more fully described, illustrated in the accompanying drawings, and pointed out in the claims hereunto appended.
In the drawings: Figure 1 is a front elevation of a screen door constructed in accordance with the invention. Fig. 2 is an edge elevation thereof. Fig. 3 is a vertical sectional view through the same. Fig. 4 is a sectional view on the line 4—4 of Fig. 1. Fig. 5 is a perspective view of the trap removed from the screen, having one end opened.

Similar reference characters indicate corresponding parts throughout the several views of the drawings.

Referring to the drawings by numerals, the screen door comprises a substantially rectangular-shaped supporting frame 5, including longitudinal side bars 6, and top and bottom end bars 7 and 8, respectively, the same being united in any suitable manner, the frame being hinged or otherwise mounted in a door casing (not shown), whereby it may be swung to open and closed position. Secured to the upper portion of the frame 5, at the outer face thereof, is an upper wire mesh section 9, the latter terminating at its inner edge medially of the door frame, while secured to the lower portion of the frame 5 is a lower wire mesh section 10, the same being of a length to overlap a portion of the upper section 9, the overlapped portion of the lower section 10 being spaced from the upper section 9 by means of guide cleats 11 fixed to the outer faces of the side bars 6 of the frame, the said lower section 10 being secured to the cleats in any suitable manner.

Removably engaging the guide cleats 11 is an insect trap, comprising a frame, including spaced parallel uprights or legs 12, the latter being engaged in spaces forming grooves 13 inner sides of the guide cleats 11 between the wire sections 9 and 10, the upper ends of the legs or uprights 12 being outwardly and inwardly curved to form alining loops 14, and these legs or uprights 12 are connected together by means of transversely disposed spaced cross braces 15, the latter being secured to the uprights or legs 12 in any suitable manner. Suitably fixed to the loops 14 is a substantially cylindrical-shaped wire mesh shell or casing 16, the edges of which are secured to one of the cross braces 15. The bottom portion of the shell or casing 16 is formed with an inner row of spaced substantially cone-shaped entrances 17 which communicate with the space between the overlapped portions of the upper and lower sections 9 and 10 on the frame 5 of the door, so that flies or insects crawling upon the inner face of the lower section 10 of the frame 5 will enter the opening in the casing or shell 16 and be trapped therein, in a manner to be presently described.

One end of the casing or shell 16 is closed by a reticulated or wire mesh end wall 18, while the opposite end is normally closed by a hinged closure cap 19, the same being formed with wire mesh cloth and carries a keeper eye 20 which is engaged by a hook 21 mounted upon the casing or shell, whereby the said cap may be sustained in closed position. On the removal of the trap from the screen door, after the catching of insects or flies, the same may be placed over a fire, or insect exterminating substance can be introduced into the said trap, for the killing of the trapped flies, whereupon the cap 21 may be opened, so that the dead flies or insects may be dumped or removed therefrom.

Fixed to the yoke 14, forwardly of the legs or uprights 12, are depending alining arms 22, to which is secured a wire mesh shield or covering 23, the same extending at opposite ends inwardly a sufficient distance to contact with the outer face of the bottom section 10 on the frame 5 of the screen door, when the trap is mounted thereon, the upper longitudinal edge of the wire mesh shield 23 being suitably secured to the casing or shell 16, while its lower edge is left free, thereby forming an exterior entrance slot 24 between the lower section 10 and the said wire mesh shield 23, so that flies or other insects falling on the outside of the bottom section 10 will gain an entrance to the trap to be caught thereby. Forwardly of the inner cone-shaped entrance 17 is a row of spaced cone-shaped outer entrances 25, the latter communicating with the space between the lower section 10 and the shield 23, so that flies crawling upwardly through the entrance space 24 will pass into the shell or casing 16, exteriorly of the screen door, as will be clearly obvious.

What is claimed is:

1. A screen of the class described, comprising a frame, upper and lower wire mesh sections mounted upon the frame and overlapping each other at their inner edges, guide means interposed between the overlapped portions of the sections and secured to the frame for spacing said sections apart, and a fly trap removably fitted in said guide means and having entrances exteriorly and interiorly of the plane of the lower section.

2. A screen of the class described, comprising a frame, upper and lower wire mesh sections mounted upon the frame and overlapping each other at their inner edges, guide means interposed between the overlapped portions of the sections and secured to the frame for spacing said sections apart, a fly trap removably fitted in said guide means and having entrances exteriorly and interiorly of the plane of the lower section, and a shield depending from the said trap exteriorly of the lower section and spaced therefrom.

In testimony whereof we affix our signatures in presence of two witnesses.

THOMAS J. McBURNEY.
JOHN McALISTER.

Witnesses:
 HARRY R. GRAY,
 U. S. G. ALLEN.

---

Copies of this patent may be obtained for five cents each, by addressing the "Commissioner of Patents. Washington, D. C."